Patented June 23, 1931

1,811,602

UNITED STATES PATENT OFFICE

WILLARD H. WOODSTOCK AND GUY A. McDONALD, OF CHICAGO HEIGHTS, ILLINOIS, ASSIGNORS TO VICTOR CHEMICAL WORKS, A CORPORATION OF ILLINOIS

MANUFACTURE OF PHOSPHORUS SULPHOCHLORIDE

No Drawing. Application filed March 13, 1930. Serial No. 435,661.

The present invention relates to improvements in the manufacture of phosphorus sulphochloride and more particularly in the production of phosphorus sulphochloride from ferrophosphorus.

In accordance with the present invention, chlorine is caused to react upon ferrophosphorus (preferably finely ground, say to about 200 mesh), with the resultant formation of a chlorinated mixture or compound which comprises phosphorous pentachloride and ferric chloride, apparently in a loosely combined form in about the proportion $PCl_5.2FeCl_3$. The constituents of this material are not separable by distillation.

In accordance with the present invention, the chlorinated ferrophosphorus compound is treated with sulfur, preferably in slight excess above that theoretically required by the equation hereinafter given. The mixture is heated under a reflux condenser to completion of reaction, the reaction mixture melting under these conditions. Reaction is completed in a comparatively short period, say one-half to one hour. After reaction is completed, the volatile constitutents of the mixture are distilled off and are found to consist of phosphorus sulphochloride and sulfur chloride, apparently formed in accordance with the following reaction.

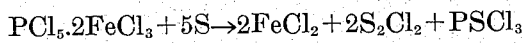
$$PCl_5.2FeCl_3 + 5S \rightarrow 2FeCl_2 + 2S_2Cl_2 + PSCl_3$$

The mixture of phosphorus sulphochloride and sulfur chloride distilled off may be separated by fractional distillation. However, it is preferred to cause it to react upon ferrophosphorus, whereupon the sulfur chloride reacts with the ferrophosphorus to form phosphorus sulphochloride, which distills off together with the phosphorus sulphochloride originally present in the mixture. The ferrophosphorus employed in this reaction is preferably comminuted, suitably to about 200 mesh. An excess of ferrophosphorus is employed, so that no unreacted-upon sulfur chloride will be distilled over with the phosphorous sulphochloride. A residue is left consisting of the excess ferrophosphorus, ferrous chloride and sulfur.

This residue may then be subjected to chlorination, preferably after having been comminuted. The sulfur of the mixture forms sulfur chloride, which reacts with a part of the ferrophosphorus, forming phosphorus sulphochloride. The chlorine reacts with the remaining ferrophosphorus, and additional ferrophosphorus may be added to be subjected to chlorination at the same time. The phosphorus sulphochloride resulting from the action of the sulfur chloride and the phosphorus pentachloride-ferric chloride complex formed as a result of the action of the chlorine on the ferrophosphorus as hereinbefore described may then be treated with sulfur, as hereinbefore described, ferrous chloride is formed as a non-volatile material and sulfur chloride and phosphorus sulphochloride as volatile materials, and distill off together with the phosphorus sulphochloride present in the mixture. By repeating the cycle, a complete conversion into phosphorus sulphochloride of the phosphorus content of the ferrophosphorus may be effected.

We claim:

1. The method of producing phosphorus sulphochloride from ferrophosphorus which comprises chlorinating ferrophosphorus, thereby forming a phosphorus pentachloride-iron chloride complex, and reacting thereupon with sulfur.

2. The method of converting ferrophosphorus into phosphorus sulphochloride which comprises chlorinating ferrophosphorus, thereby forming a phosphorus pentachloride-iron chloride complex, reacting thereupon with sulfur, whereby phosphorus sulphochloride and sulfur chloride are formed, distilling off and collecting the phosphorus sulphochloride and sulfur chloride, and contacting them with additional ferrophosphorus, whereby the sulfur chloride is converted into phosphorus sulphochloride.

3. The method of converting ferrophosphorus into phosphorus sulphochloride which comprises reacting upon ferrophosphorus with chlorine, thereby forming a complex of chlorinated compounds of phosphorus and iron, subjecting them to the action of sulfur, whereby phosphorus sulphochloride and sulfur chloride are formed, distilling the phosphorus sulphochloride and sulfur chloride from the reaction mixture and collecting them, contacting the collected phosphorus sulphochloride and sulfur chloride with an excess of ferrophosphorus, whereby the sulfur chloride is converted into phosphorus sulphochloride, distilling off the total phosphorus sulphochloride content of the mixture, and subjecting the residual ferrophosphorus to the action of chlorine, thereby forming the aforesaid chlorinated phosphorus and iron complex.

In testimony whereof we have hereunto set our hands this 8th day of March, 1930.

WILLIARD H. WOODSTOCK.
GUY A. McDONALD.